United States Patent
Sujan et al.

(10) Patent No.: US 8,869,512 B2
(45) Date of Patent: Oct. 28, 2014

(54) COMBINED ENGINE OUT $NO_X$ MANAGEMENT

(75) Inventors: Vivek Anand Sujan, Columbus, IN (US); Abdul R. Ofoli, Chattanooga, TN (US); Govindarajan Korthandaraman, Columbus, IN (US)

(73) Assignee: Commins Inc., Columbus, IN (US)

( * ) Notice: Subject to any disclaimer, the term of this patent is extended or adjusted under 35 U.S.C. 154(b) by 212 days.

(21) Appl. No.: 13/439,575

(22) Filed: Apr. 4, 2012

(65) Prior Publication Data
US 2012/0260630 A1  Oct. 18, 2012

Related U.S. Application Data

(60) Provisional application No. 61/472,420, filed on Apr. 6, 2011.

(51) Int. Cl.
| | |
|---|---|
| *F01N 3/00* | (2006.01) |
| *F02D 41/00* | (2006.01) |
| *F02D 41/02* | (2006.01) |
| *F02D 41/14* | (2006.01) |
| *F02D 21/08* | (2006.01) |
| *F02D 41/40* | (2006.01) |
| *F01N 3/20* | (2006.01) |

(52) U.S. Cl.
CPC ............... *F02D 21/08* (2013.01); *Y02T 10/47* (2013.01); *F02D 41/405* (2013.01); *F02D 41/005* (2013.01); *Y02T 10/44* (2013.01); *F01N 3/2066* (2013.01); *F02D 41/0235* (2013.01); *F02D 41/1401* (2013.01); *F02D 41/402* (2013.01); *F02D 41/403* (2013.01); *F02D 2250/36* (2013.01); *F02D 41/1406* (2013.01); *F02D 2041/1433* (2013.01)
USPC ................... 60/274; 60/278; 60/287; 60/286; 60/297; 60/298

(58) Field of Classification Search
CPC ....... F01N 3/206; F01N 3/2066; F01N 3/208; F02D 41/0047; F02D 41/0072; F02D 41/0077; F02D 2041/0047; F02D 2041/0072; F02M 25/07; F02M 25/0724; F02M 25/0726; F02M 25/0729; F02M 25/0738
USPC ............. 6/274, 278, 280, 285, 287, 297, 298, 6/301, 320
See application file for complete search history.

(56) References Cited

U.S. PATENT DOCUMENTS

| | | | |
|---|---|---|---|
| 5,924,280 A | 7/1999 | Tarabulski | |
| 6,152,118 A * | 11/2000 | Sasaki et al. | ............. 123/568.21 |

(Continued)

FOREIGN PATENT DOCUMENTS

| | | |
|---|---|---|
| EP | 0998625 | 11/2004 |
| WO | 2010068147 | 6/2010 |

*Primary Examiner* — Binh Q Tran
(74) *Attorney, Agent, or Firm* — Krieg DeVault LLP

(57) ABSTRACT

An apparatus for controlling engine operations to a low NOx output amount at low selective catalytic reduction (SCR) temperature values and alternatively for controlling engine operations in an EGR cooler bypass regime at low engine load levels is described. The apparatus includes a controller that interprets a present speed and a present load of an engine, that determines an engine operating region in response to the present speed and the present load, and that provides an EGR cooler bypass command that provides EGR cooler bypass flow in response to the engine operating region being a first, low load, region. The controller operates the engine with supplemental $NO_x$ management in response to the engine operating region being a second, intermediate load, region. The controller operates the engine without either of the EGR cooler bypass or the supplemental $NO_x$ management in response to the engine operating region being a third region.

22 Claims, 4 Drawing Sheets

(56) References Cited

U.S. PATENT DOCUMENTS

| | | |
|---|---|---|
| 6,871,490 B2 | 3/2005 | Liang et al. |
| 7,281,518 B1 | 10/2007 | Allain et al. |
| 7,832,200 B2 | 11/2010 | Kesse et al. |
| 7,861,518 B2 | 1/2011 | Federle |
| 7,963,103 B2 * | 6/2011 | Nagaoka et al. ............... 60/286 |
| 8,127,536 B2 * | 3/2012 | Hosaka ........................... 60/295 |
| 8,156,729 B2 * | 4/2012 | Sun ................................. 60/277 |
| 8,171,720 B2 * | 5/2012 | Wang et al. .................... 60/277 |
| 8,499,550 B2 * | 8/2013 | Perfetto et al. ................. 60/295 |
| 2004/0098978 A1 | 5/2004 | Tarabulski et al. |
| 2009/0101122 A1 | 4/2009 | Kurtz et al. |
| 2009/0158706 A1 | 6/2009 | Sun |
| 2009/0217645 A1 | 9/2009 | Sisken et al. |
| 2009/0299600 A1 | 12/2009 | Guo et al. |
| 2010/0024397 A1 | 2/2010 | Chi et al. |

* cited by examiner

COMBINED ENGINE OUT NO$_X$ MANAGEMENT

RELATED APPLICATIONS

This application is related to, and claims the benefit of, U.S. Provisional Patent Application 61/472,420 filed on Apr. 6, 2011, which is incorporated herein by reference in the entirety for all purposes.

BACKGROUND

The technical field generally relates to NO$_x$ management of engines having a NO$_x$ aftertreatment system. The utilization of an EGR cooler bypass allows for aftertreatment temperature increases, while maintaining NO$_x$ control, in operation regions where such increases are desirable. EGR cooler bypassing further provides for increased operating life of the EGR cooler due to a lower overall exposure time to EGR gases, and especially lower temperature EGR gases. However, EGR cooler bypass is limited by the maximum temperature the system allows for the intake manifold and by system limitations due to increased temperature at the intake manifold—for example the reduced charge density of gases in the intake manifold. In certain operating regions of many engines, exhaust temperatures may be too low for optimal operation of the NO$_x$ aftertreatment (e.g. an SCR catalyst), and the operating limitations may disallow EGR cooler bypass operation at some of these certain operating regions.

Memory intensive control schemes for managing these complexities are undesirable. Increasing the onboard computing capability for a system increases the cost of the engine package, and this cost increase is exacerbated by the properties which the computer package must have to withstand the harsh operating environments that engine-related computers experience. Therefore, further technological developments are desirable in this area.

DESCRIPTION OF ILLUSTRATIVE EMBODIMENTS

Figure 1:
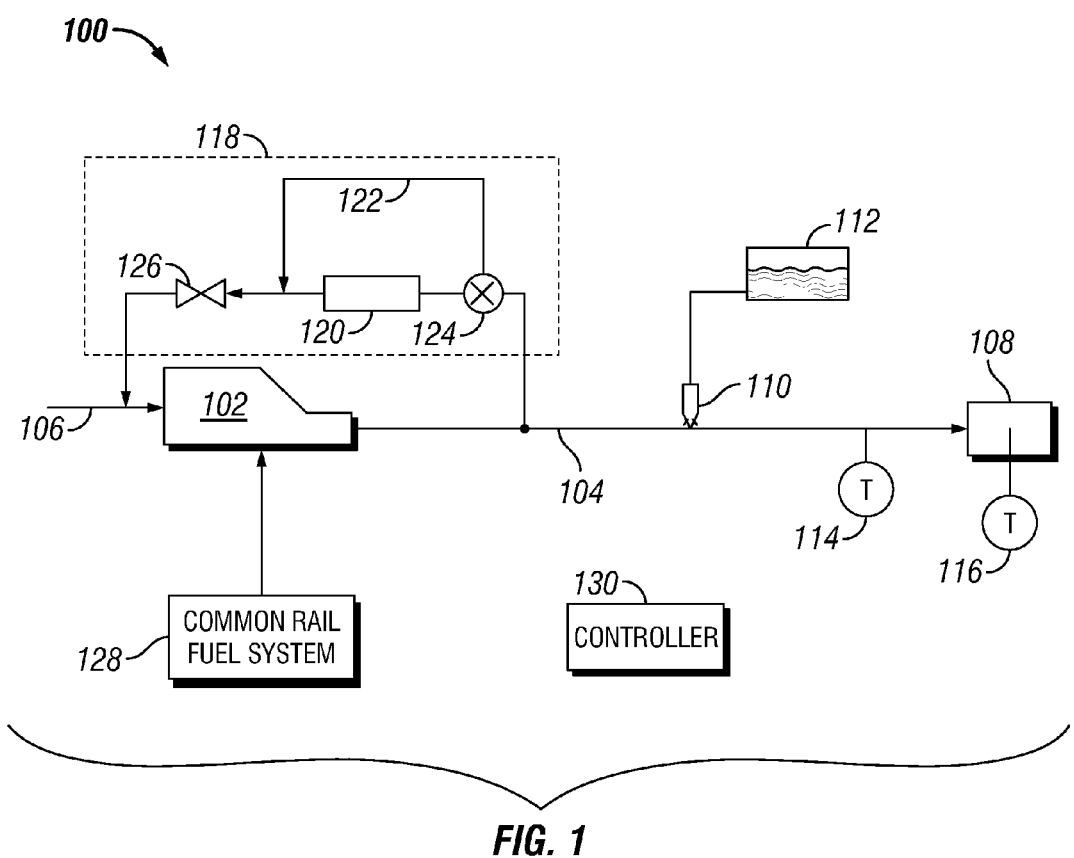
FIG. 1 is a schematic diagram of a system for combined engine out NO$_x$ management.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

FIG. 1 is a schematic diagram of a system 100 for combined engine out NO$_x$ management. The system includes an internal combustion engine 102 producing NO$_x$ as a byproduct of the engine operation. The engine 102 includes an intake 106 and an exhaust 104. The system 100 further includes an aftertreatment system 108 that treats the engine exhaust 104 to reduce the amount of NO$_x$ in the exhaust during at least some engine operating conditions. The aftertreatment system 108 may be an SCR system having a NO$_x$ reduction catalyst that reduces NO$_x$ in the presence of a reductant 112 such as ammonia or urea. The reductant 112 is supplied to the exhaust 104 in a controlled manner by an injector 110 (or doser, etc.).

The NO$_x$ reduction catalyst has an inlet temperature and a catalyst bed temperature. The temperatures of the NO$_x$ reduction catalyst may be detected by sensors 114, 116 and/or may be estimated by models of the engine exhaust 104 and aftertreatment system 108. Certain embodiments of the system detect only one of the inlet temperature or the catalyst bed temperature, or neither temperature. The catalyst bed temperature may be determined by a detected temperature upstream and downstream of the catalyst bed, utilizing a weighted average to estimate the catalyst bed temperature. The catalyst bed temperature may be a temperature of a single catalyst brick where multiple catalyst bricks are present (not shown), and may be an average temperature of more than one catalyst brick.

The average temperature may be an estimate of a specific physical temperature, a temperature of a center-of-mass for all catalyst bricks, or a temperature selected to be most descriptive of an aggregate capacity of the aftertreatment system to convert NO$_x$ at the present moment. For example, where the sum of all catalyst bricks in the system 100 includes a specific estimated capacity to convert NO$_x$, the average temperature may be a temperature that provides an equivalent capacity to convert NO$_x$ even if no single catalyst of the catalyst bricks is estimated to have the average temperature.

The system 100 further includes an EGR system 118 including an EGR cooler 120, and an EGR cooler bypass 122. The flow of EGR may be controlled, in part, by an EGR valve 126 which is illustrated downstream of the EGR cooler 120 but may be positioned at other locations in the EGR system 118. The EGR cooler bypass 122 is controlled, in the illustration of FIG. 1, by a three-way valve 124 that selectively provides EGR gases to the main EGR flow path or the EGR bypass 122. Additional or substitute valves may be present that perform similar control and bypass operations for EGR flow.

Certain embodiments of the system 100 include a common rail fuel system 128 for the engine capable of delivering multiple fuel injections per combustion event. The common rail fuel system 128 is illustrated schematically, and may be any type of common rail fuel system 128 understood in the art. The common rail fuel system 128 is present for a system 100 where multiple fuel injections are performed per combustion event at certain operating conditions, and certain systems 100 may not include a common rail fuel system 128. The multiple fuel injections include a main fuel injection event, one or more post-injection events, and may further include one or more pilot or pre-injection events. The main fuel injection event may include a single fuel injection event or be divided into two or more fuel injection events. Further, any fuel injection events (main, pre-, or post-) may be combined into a continuous, rate-shaped, fuel injection operation according to the capabilities of the fuel system.

The amount and timing of each injection event is fully or partially controllable. A fully controllable system 128 includes selecting a timing and amount of each fuel injection event, where a partially controllable system imposes operational limitations of the fuel system onto theoretical fuel injection events, for example limiting the amounts of pre- and post-injection events, the offset of pre- and post-injection events (in terms of crank angle degrees) from a main injection event, and/or the amount of a total amount of fuel that can be contributed from the pre-, main, and post-injection events.

In certain embodiments, the system 100 further includes a controller 130 structured to perform certain operations to functionally execute combined engine out $NO_x$ management. In certain embodiments, the controller 130 forms a portion of a processing subsystem including one or more computing devices having memory, processing, and communication hardware. The controller 130 may be a single device or a distributed device, and the functions of the controller 130 may be performed by hardware or software.

In certain embodiments, the controller 130 includes one or more modules structured to functionally execute the operations of the controller 130. In certain embodiments, the controller 130 includes a weighting factor determination module. The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or software on computer readable medium, and modules may be distributed across various hardware or software components. More specific descriptions of certain embodiments of controller operations are included in the section referencing FIG. 2.

Figure 2:
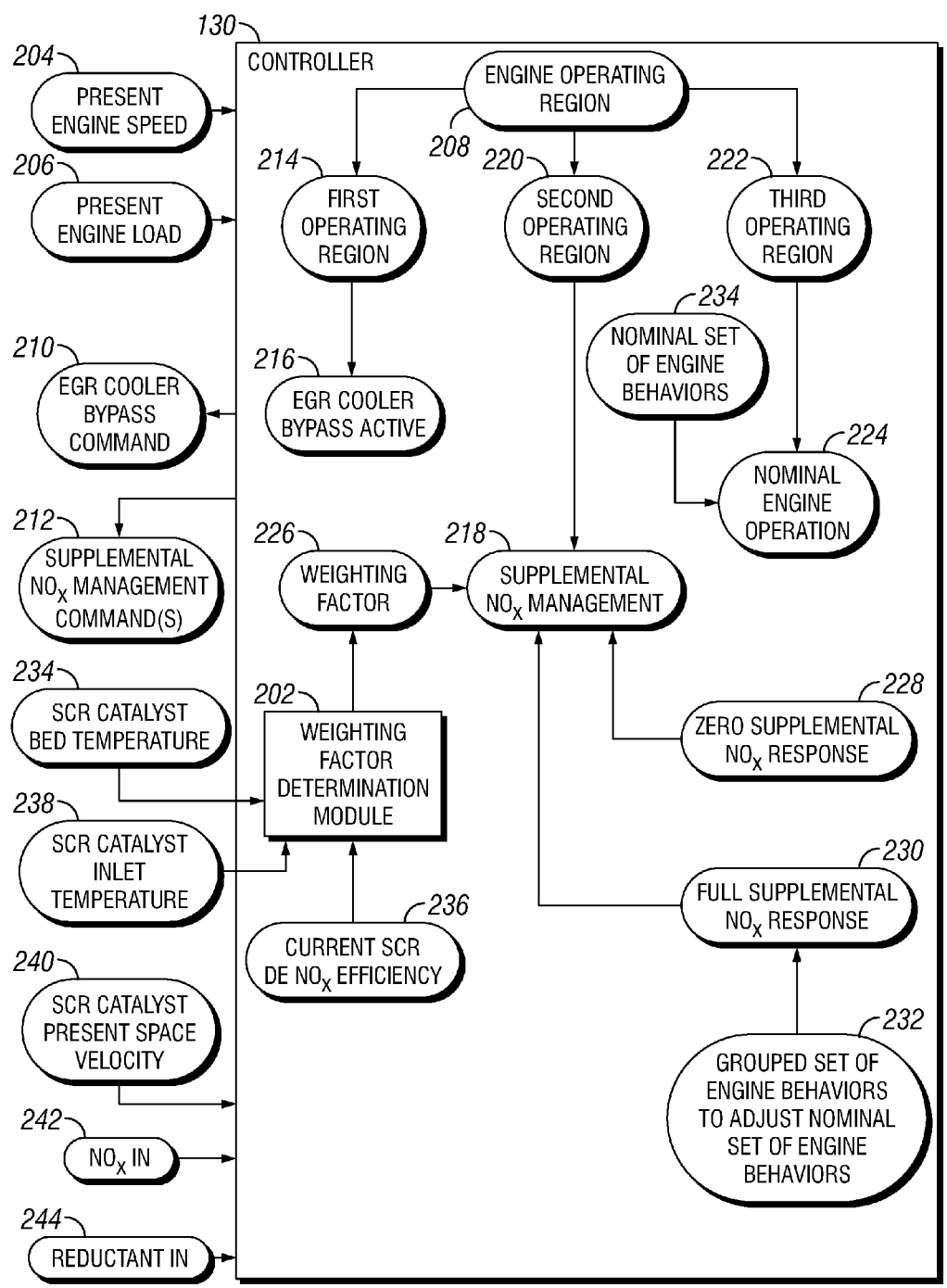
FIG. 2 is a schematic diagram of a controller that executes certain functions for combined engine out NO$_x$ management.

Referencing FIG. 2, an exemplary controller 130 is illustrated. The controller 130 interprets a present engine speed 204 and a present engine load 206, and determines an engine operating region 208 in response to the present engine speed 204 and the present engine load 206. The controller 130 further operates the engine in response to the engine operating region 208, for example by providing an EGR cooler bypass command 210 and/or one or more supplemental $NO_x$ management commands 212. According to the engine operating region 208, the controller 130 operates the engine with the EGR cooler bypass active 216 at a first operating region 214, which may be a low power region. The controller 130 operates the engine with supplemental $NO_x$ management 218 at a second operating region 220, which may be an intermediate power region. The controller 130 operates the engine without the EGR cooler bypass 216 or the supplemental $NO_x$ management 220, e.g. with nominal engine operation 224, at a third operating region 222.

Figure 6:
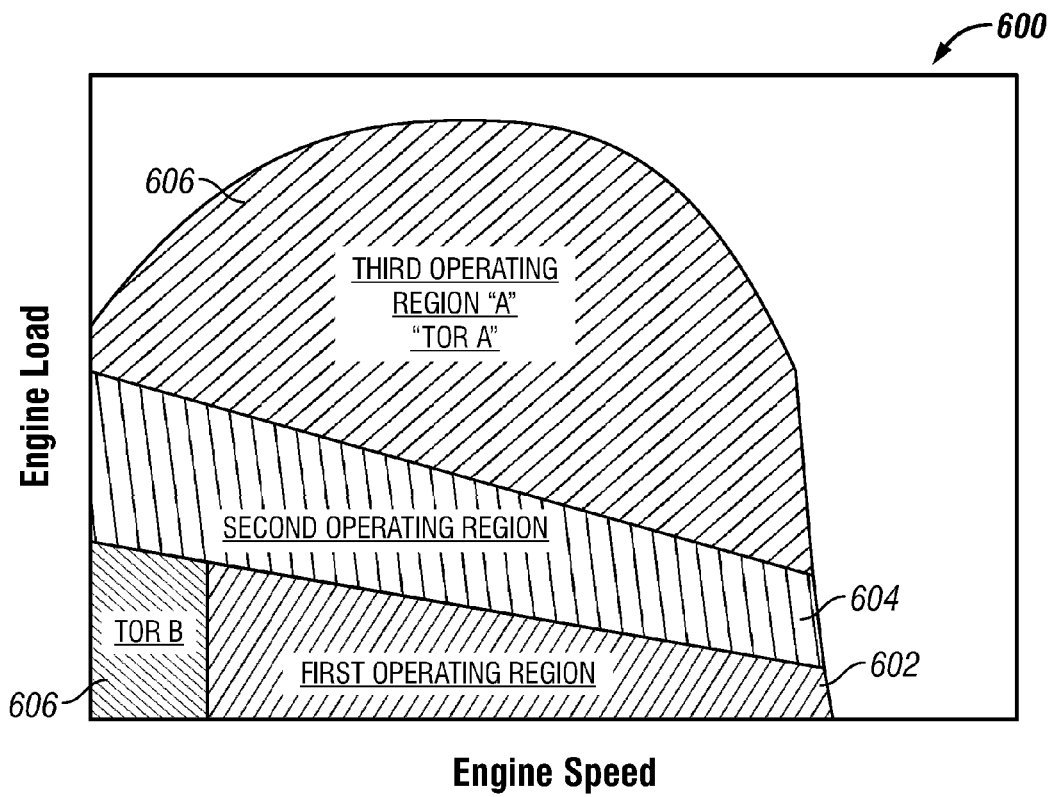
FIG. 6 is an illustration of a plurality of engine operating regions.

Referencing FIG. 6, an engine speed-load diagram 600 is shown with an exemplary first operation region 302, second operating region 606, and third operating region 606. In the example of FIG. 6, the third operating region 606 is divided into a "TORA" and "TORB" section, but in one example the third operating region 606 is merely all operating points that are not in the first operation region 602 or second operating region 604. In certain embodiments, operating points outside of the first operating region 602 and second operating region 604 are not marked as an operating region or utilized by the controller 130.

The first operating region 602 shown in FIG. 6 is illustrative and system dependent. A first operating region 602 for a specific system includes operating points where EGR cooler bypass provides sufficient $NO_x$ control and temperature benefits without exceeding an intake manifold temperature limit. The second operating region 604 shown in FIG. 6 is illustrative and system dependent. A second operating region 604 for a specific system includes operating points where the $NO_x$ aftertreatment control system will not achieve sufficient $NO_x$ control, or will only marginally achieve sufficient $NO_x$ control, without a $NO_x$ reduction in the engine output. The first and second operating regions 602, 604 may include overlaps, gaps therebetween, hysteresis in operations switching between the first and second operating region, and/or other control features known in the art to reduce mode switching or other undesired behaviors.

Returning to FIG. 2, an example controller 130 determines a weighting factor 226 when the engine operating region is the second operating region 220, and applies the supplemental $NO_x$ management 218 in an amount between zero supplemental $NO_x$ response 228 and full supplemental $NO_x$ response 230 in response to the weighting factor 226. The zero supplemental $NO_x$ response 228 may be a minimal $NO_x$ response, a low value for a $NO_x$ response, or the like. In certain embodiments, the engine behaviors exhibited by the supplemental $NO_x$ management 218 include a grouped set of engine behaviors 232 to adjust a nominal set of engine behaviors 234. The supplemental $NO_x$ management 218 operating on the zero supplemental $NO_x$ response 228 may be equivalent to the nominal set of engine behaviors 234, or may be a different set of behaviors with zero or minimal supplemental $NO_x$ management 218 applied.

An example controller 130 includes a weighting factor determination module 202 that determines the weighting factor 226 in response to an SCR catalyst bed temperature 234, a current SCR $deNO_x$ efficiency 236, a two-dimensional lookup based on SCR catalyst bed temperature 234 and current $deNO_x$ efficiency 236, a two-dimensional lookup based on SCR catalyst inlet temperature 238 and current SCR $deNO_x$ efficiency 236, and/or an SCR catalyst inlet temperature 238.

Where a current SCR $deNO_x$ efficiency 236 is utilized to determine the weighting factor 226, the SCR $deNO_x$ efficiency 236 is determined according to the SCR catalyst bed temperature 234, SCR catalyst inlet temperature 238, SCR catalyst present space velocity 240 (e.g. determine at the present exhaust flow rate), the $NO_x$ in 242 to the SCR catalyst, and/or the reductant in 244 to the SCR catalyst. Alternatively, the current SCR $deNO_x$ efficiency 236 is determined according to a measured inlet and outlet $NO_x$ for the SCR catalyst.

Figure 3:
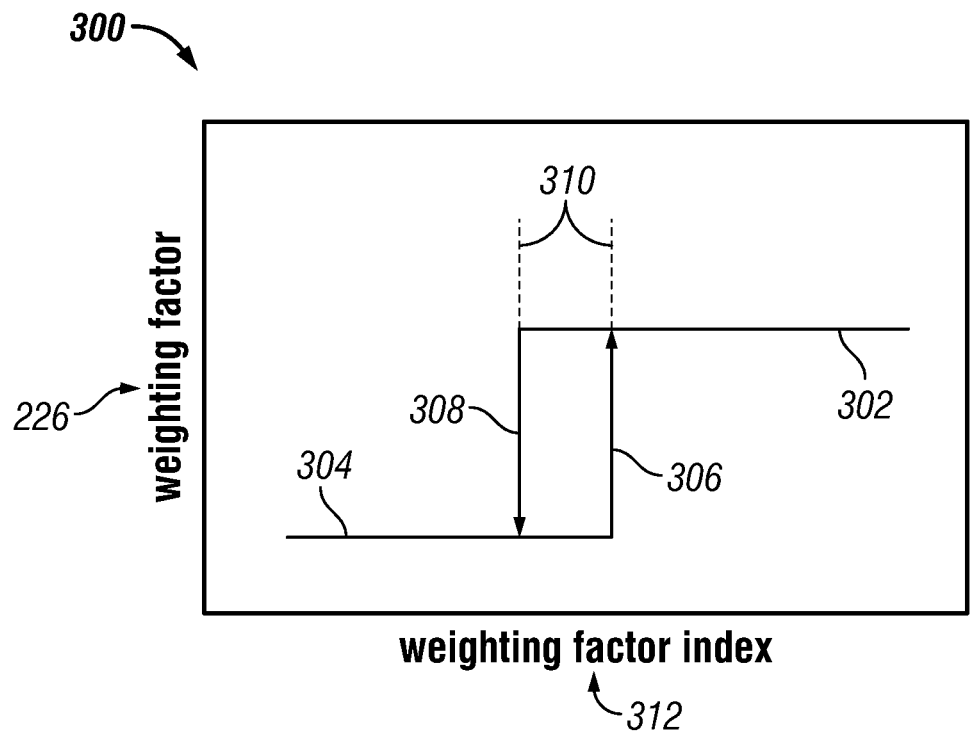
FIG. 3 is an illustration of a weighting factor as a function of a weighting factor index.

In certain embodiments, the controller 130 determines the weighting factor 226 in response to one of the SCR catalyst bed temperature 234 and the SCR catalyst inlet temperature 238, where the weighting factor 226 is a binary output that is a low weighting factor or a high weighting factor. For example, referencing the illustrative relationship 300 depicted in FIG. 3, a weighting factor index 302 is determined according to the SCR catalyst bed or inlet temperature, and/or the current SCR $deNO_x$ efficiency, and the weighting factor 226 is a low value 304 or a high value 302 in response to the weighting factor index. Additionally, the weighting factor determination module 202 applies a hysteresis to the binary output, where the weighting factor rises to the high value at a weighting factor index 306, returns to the low value at a weighting factor index 308, and may be at either the high value or the low value in the range of index values 310.

Figure 4:
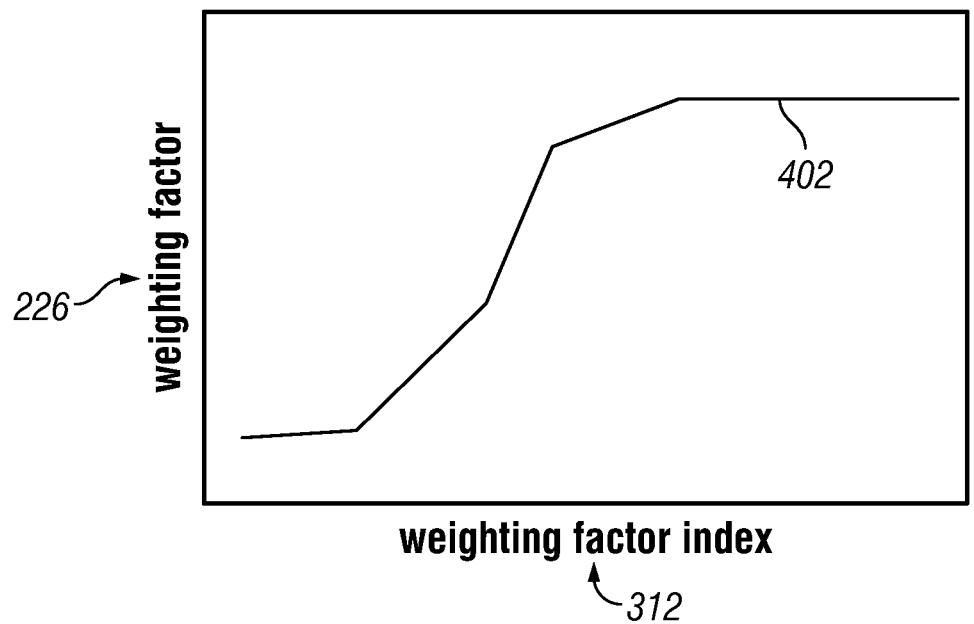
FIG. 4 is an illustration of a weighting factor as an alternate function of a weighting factor index.

Referencing FIG. 4 another weighting factor 226 as a function 402 of a weighting factor index 312 is illustrated. The shape of the function 402 is exemplary, and any shape determined from principles understood in the art is contemplated herein. For example, the function 402 may be determined according to desired $NO_x$ reduction amounts as a function of an SCR catalyst bed temperature 234.

Figure 5:
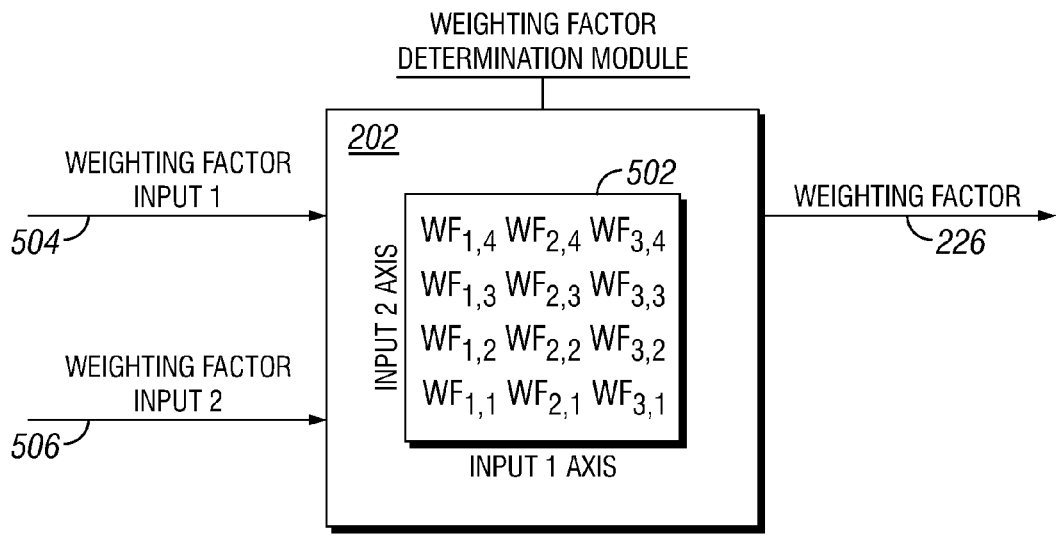
FIG. 5 is an illustration of exemplary operations of a weighting factor determination module.

Referencing FIG. 5, another weighting factor 226 as an output of a two-dimensional lookup table 502 is illustrated. The lookup table 502 operates as understood in the art, with a first weighting factor input 504 comprising a first input axis, a second weighting factor input 506 comprising a second input axis, and the weighting factor 226 determined according to the first weighting factor input 504 and the second weighting factor input 506. The weighting factor 226 may be determined according to the closest matching input values from the axes, according to interpolated values, and may further include limitation to the table 502 values or extrapolation beyond the table 502 values. The first and second weighting factor values 504, 506 may include an SCR catalyst inlet temperature 238, SCR catalyst bed temperature 234, and/or an SCR catalyst deNO$_x$ efficiency 236. The example lookup table 502 includes a number of potential output values corresponding to a number of input values, for example the value $WF_{1,4}$ corresponds to a first value of the weighting factor input 504 and a fourth value of the weighting factor input 506, while the value $WF_{2,2}$ corresponds to a second value of the weighting factor input 504 and a second value of the weighting factor input 506. The form and function of the lookup table 502 is an example, and any operations to determine an output for a function having two or more weighting factor inputs 504, 506 is contemplated herein.

The exemplary weighting factor 226 in an embodiment may be a value between zero and one, inclusive. The weighting factor 226 may use any other enumeration scheme understood in the art. A non-limiting example of a weighting factor 226 includes a weighting factor 226 used directly for supplemental NO$_x$ management 218 (e.g. a weighting factor defining an EGR fraction target, a post-injection percentage of a total fueling amount, etc.).

In certain embodiments, the controller 130 performs nominal engine operation according to a nominal grouped set of engine behaviors 234, and the supplemental NO$_x$ management 218 is a grouped set of engine behaviors that adjust the nominal set of engine behaviors 232. For example, the controller 130 determines that the engine is in the second operating region 220, determines a weighting factor 226, and mixes the supplemental NO$_x$ management 218 response with the nominal set of engine behaviors 234 according to the weighting factor 226.

Example engine behaviors included in the supplemental NO$_x$ management 218 response include a torque-to-fuel conversion model, one or more fuel injection timing values, one or more fuel injection quantity values, a charge flow amount target, and/or an EGR flow amount target. In one example, large changes in one or more fuel injection quantity values change the known relationship between realized torque from the amount of injected fuel, which is corrected for with a change in a torque-to-fuel conversion model. Any one or more of the grouped set of engine behaviors 232 to adjust the nominal set of engine behaviors 234 may be utilized when the controller 230 is applying the supplemental NO$_x$ management 218. In certain embodiments, the controller applies the supplemental NO$_x$ management 218 response according to the weighting factor 226, or determines a target response according to the weighting factors and smoothly adjusts engine operations until the target response is fully applied or until the response is proceeding acceptably toward the target response.

Another exemplary embodiment is a procedure for engine NO$_x$ control. The procedure includes an operation to interpret a present engine speed and a present engine load. Interpreting a data value includes, without limitation, reading the value from a memory location, receiving the value over a datalink, receiving the value as a physical value (e.g. a voltage reading from a sensor), and/or calculating the value from one or more other parameters. The procedure further includes an operation to determine an engine operating region in response to the present engine speed and the present engine load, and operating the engine in response to the engine operating region. Operating the engine includes operating the engine such that the engine operates with an EGR cooler bypass at a first region, with supplemental NO$_x$ management at a second region, and without the EGR cooler bypass or the supplemental NO$_x$ management at a third region (or at regions that are not the first region or the second region). The exemplary first region includes a low engine power region, and the second region includes an intermediate engine power region.

The exemplary procedure further includes operating the engine with supplemental NO$_x$ management by operating between zero supplemental NO$_x$ response and a full supplemental NO$_x$ response according to a weighting factor. The procedure includes determining the weighting factor in response to an SCR catalyst bed temperature, a current SCR deNO$_x$ efficiency, a two dimensional lookup based on SCR catalyst bed temperature and current SCR deNO$_x$ efficiency, and/or an SCR catalyst inlet temperature. The procedure alternatively or additionally includes determining the weighting factor from one of the SCR catalyst bed temperature and the SCR catalyst inlet temperature, where the weighting factor is a binary output including one of a low weighting factor and a high weighting factor. The exemplary method further includes applying a hysteresis to the binary output.

The exemplary procedure further includes an operation to determine the weighting factor as a value between zero (0) and one (1) inclusive, where a zero indicates that zero supplemental NO$_x$ response is applied and a one indicates that a full supplemental NO$_x$ response is applied. The supplemental NO$_x$ response includes a grouped set of engine behaviors, which are applied as modifications or replacements to a nominal grouped set of engine behaviors. The supplemental NO$_x$ response grouped set of engine behaviors may be a complete or partial list of behaviors from the nominal grouped set of engine behaviors. The supplemental NO$_x$ response grouped set of engine behaviors include a torque to fuel conversion model, one or more fuel injection timing values, one or more fuel injection quantity values, a charge flow amount target, and/or an EGR flow amount target.

As is evident from the figures and text presented above, a variety of embodiments according to the present invention are contemplated.

A system includes an internal combustion engine producing NO$_x$ as a byproduct of the engine operation, the engine having an intake and an exhaust. The system further includes an aftertreatment system structured to treat the engine exhaust to reduce the amount of NO$_x$ in the exhaust during at least some engine operating conditions. The aftertreatment system may be an SCR system having a NO$_x$ reduction catalyst that reduces NO$_x$ in the presence of a reductant such as ammonia or urea.

The NO$_x$ reduction catalyst has an inlet temperature and a catalyst bed temperature. The temperatures of the NO$_x$ reduction catalyst may be detected by a sensor and/or estimated by models of the engine exhaust and aftertreatment system. Certain embodiments of the system detect only one of the inlet temperature and catalyst bed temperature, or neither temperature. The catalyst bed temperature may be a temperature of a single catalyst brick where multiple catalyst bricks are present, and may be an average temperature of more than one catalyst brick. The average temperature may be a physical average temperature, a center-of-mass temperature of all bricks, and/or a temperature selected to be most descriptive of an aggregate capacity of the aftertreatment system to convert $NO_x$ at the present moment.

The system further includes an EGR system including an EGR cooler, and an EGR cooler bypass. Certain embodiments of the system include a common rail fuel system for the engine capable of delivering multiple fuel injections per combustion event. The multiple fuel injections include a main fuel injection event, one or more post-injection events, and may further include one or more pilot or pre-injection events. The amount and timing of each injection event is fully or partially controllable.

The system includes a controller that interprets a present engine speed and a present engine load, that determines an engine operating region in response to the present engine speed and load, and that operates the engine in response to the engine operating region. The controller operates the engine with the EGR cooler bypass active at a first operating region, which may be a low power region. The controller operates the engine with supplemental $NO_x$ management at a second operating region, which may be an intermediate power region. The controller operates the engine without the EGR cooler bypass or the supplemental $NO_x$ management at a third region.

In certain embodiments, the controller determines a weighting factor when the engine operating region is the second operating region, and applies the supplemental $NO_x$ management in an amount between zero supplemental $NO_x$ response and full supplemental $NO_x$ response in response to the weighting factor. The controller determines the weighting factor in response to an SCR catalyst bed temperature, a current SCR $deNO_x$ efficiency, a two-dimensional lookup based on SCR catalyst bed temperature and current $deNO_x$ efficiency, a two-dimensional lookup based on SCR catalyst inlet temperature and current $deNO_x$ efficiency, and/or an SCR catalyst inlet temperature. In certain embodiments, the controller determines the weighting factor in response to one of the SCR catalyst bed temperature and the SCR catalyst inlet temperature, where the weighting factor is a binary output that is a low weighting factor or a high weighting factor. In certain further embodiments, the controller applies a hysteresis to the binary output.

The exemplary weighting factor in an embodiment may be a value between zero and one, inclusive. The weighting factor may use any other enumeration scheme understood in the art.

In certain embodiments, the controller operates the engine based on a nominal grouped set of engine behaviors, and the supplemental $NO_x$ response is a grouped set of engine behaviors that adjust the nominal set of engine behaviors. Exemplary engine behaviors included in the supplemental $NO_x$ response include a torque-to-fuel conversion model, one or more fuel injection timing values, one or more fuel injection quantity values, a charge flow amount target, and/or an EGR flow amount target.

Another exemplary embodiment is a method including interpreting a present engine speed and a present engine load, determining an engine operating region in response to the present engine speed and the present engine load, and operating an engine in response to the engine operating region. The operating the engine is performed such that the engine operates with an EGR cooler bypass at a first region, with supplemental $NO_x$ management at a second region, and without the EGR cooler bypass or the supplemental $NO_x$ management at a third region. The exemplary first region includes a low engine power region, and the second region includes an intermediate engine power region.

The exemplary method includes operating the engine with supplemental $NO_x$ management by operating between zero supplemental $NO_x$ response and a full supplemental $NO_x$ response according to a weighting factor. The weighting factor is determined in response to an SCR catalyst bed temperature, a current SCR $deNO_x$ efficiency, a two dimensional lookup based on SCR catalyst bed temperature and current SCR $deNO_x$ efficiency, and/or an SCR catalyst inlet temperature. Additional or alternative embodiments include determining the weighting factor from one of the SCR catalyst bed temperature and the SCR catalyst inlet temperature, where the weighting factor is a binary output including one of a low weighting factor and a high weighting factor. The exemplary method further includes applying a hysteresis to the binary output.

The exemplary method further includes the weighting factor being a value between zero (0) and one (1) inclusive, where a zero indicates that zero supplemental $NO_x$ response is applied and a one indicates that a full supplemental $NO_x$ response is applied. The supplemental $NO_x$ response includes a grouped set of engine behaviors, which are applied as modifications or replacements to a nominal grouped set of engine behaviors. The supplemental $NO_x$ response grouped set of engine behaviors may be a complete or partial list of behaviors from the nominal grouped set of engine behaviors. The supplemental $NO_x$ response grouped set of engine behaviors include a torque to fuel conversion model, one or more fuel injection timing values, one or more fuel injection quantity values, a charge flow amount target, and/or an EGR flow amount target.

Another example set of embodiments is a method including interpreting a present engine speed and a present engine load, determining an engine operating region in response to the present engine speed and the present engine load, operating the engine with an EGR cooler bypass in response to the engine operating region being a first region, operating the engine with supplemental $NO_x$ management in response to the engine operating region being a second region, and operating the engine without either of the EGR cooler bypass or the supplemental $NO_x$ management in response to the engine operating region being a third region.

Certain further embodiments of the example method are described following. An example method includes the first region being a low engine power region, and wherein the second region comprises an intermediate engine power region. In certain embodiments, low engine power is any engine power low enough that the resulting engine exhaust temperature, without additional temperature generation assistance, will not provide an acceptably high temperature in a downstream aftertreatment component to meet the designed aftertreatment operations. In certain further embodiments, the first region excludes areas of the engine speed-load operating space where, even with the assistance of an EGR cooler bypass operation, the resulting engine exhaust temperature will still not provide an acceptably high temperature in a downstream aftertreatment component to meet the designed aftertreatment operations.

An example method further includes determining a $NO_x$ response weighting factor, and the operating the engine with supplemental $NO_x$ management includes operating between zero supplemental $NO_x$ response and a full supplemental $NO_x$ response according to the $NO_x$ response weighting factor. Example supplemental $NO_x$ response operations include a grouped set of engine behaviors, where the grouped set of engine behaviors includes two or more of: a torque to fuel conversion model, one or more fuel injection timing values, one or more fuel injection quantity values, a charge flow amount target, and an EGR flow amount target. An example torque to fuel conversion model updates engine fueling values to ensure that a targeted engine torque (or engine speed, engine power, etc. according to the specific governor control of the engine) is achieved even as the timing of injection events and the ratio of fuel injected between injection regimes (such as: very early pilot, pilot, main, post, late post, very late post, etc.) are adjusted. An example method further includes determining the $NO_x$ response weighting factor in response to one of the SCR catalyst bed temperature and the SCR catalyst inlet temperature, where the $NO_x$ response weighting factor is a binary value including either a low weighting factor or a high weighting factor. An example method further includes applying a hysteresis to the binary value.

An example method includes determining the $NO_x$ response weighting factor in response to one of an SCR catalyst bed temperature, a current SCR $deNO_x$ efficiency, a two dimensional lookup based on SCR catalyst bed temperature and current SCR $deNO_x$ efficiency, and/or an SCR catalyst inlet temperature. In certain further embodiments, the $NO_x$ response weighting factor includes a value between zero (0) and one (1) inclusive, where a zero indicates that zero supplemental $NO_x$ response is applied and one indicates that a full supplemental $NO_x$ response is applied. Zero supplemental $NO_x$ response includes a minimum applied $NO_x$ reduction response, and/or nominal operations of the engine with no $NO_x$ reduction response applied. In certain further embodiments, the supplemental $NO_x$ response includes a grouped set of engine behaviors. The grouped set of engine behaviors includes, without limitation, two or more of the behaviors including: a torque to fuel conversion model, one or more fuel injection timing values, one or more fuel injection quantity values, a charge flow amount target, and/or an EGR flow amount target.

Another example set of embodiments is a system including an internal combustion engine receiving intake gas and producing exhaust gas, an exhaust operationally coupled to the engine and receiving the exhaust gas, and an exhaust gas recirculation (EGR) system that returns a portion of the exhaust gas to the intake gas, the EGR system including an EGR cooler and an EGR cooler bypass that has a controllable EGR cooler bypass valve.

The system includes a controller that functionally executes operations for controlling engine operations to a low $NO_x$ output amount at low selective catalytic reduction (SCR) temperature values and alternatively for controlling engine operations in an EGR cooler bypass regime at low engine load levels. The controller interprets a present speed and a present load of the engine, determines an engine operating region in response to the present speed and the present load, provides an EGR cooler bypass command that provides EGR cooler bypass flow in response to the engine operating region being a first region, operates the engine with supplemental $NO_x$ management in response to the engine operating region being a second region, and operates the engine without either of the EGR cooler bypass or the supplemental $NO_x$ management in response to the engine operating region being a third region. The EGR cooler bypass valve is responsive to the EGR cooler bypass command.

In certain embodiments, a system includes the first region being a low power region and the second region being an intermediate power region. An example system includes a selective catalytic reduction (SCR) aftertreatment system that receives at least a portion of the exhaust, where the controller further determines a $NO_x$ response weighting factor, and operates the engine with supplemental $NO_x$ management in response to the $NO_x$ response weighting factor. In certain further embodiments, the controller operates the engine between a zero supplemental $NO_x$ response and a full supplemental $NO_x$ response according to the $NO_x$ response weighting factor. In certain further embodiments, the system includes a common rail fuel system, where the supplemental $NO_x$ response includes a fueling parameter and a torque to fuel conversion model. An example system includes the fueling parameter being one or more fuel injection timing values, and/or one or more fuel injection quantity values.

An example system includes the supplemental $NO_x$ response including a charge flow amount target and/or an EGR flow amount target. In certain embodiments, the controller further interprets one of an SCR catalyst bed temperature and an SCR catalyst inlet temperature, and determines the $NO_x$ response weighting factor in response to the one of the SCR catalyst bed temperature and the SCR catalyst inlet temperature. In certain embodiments, the system further includes the controller further determining the $NO_x$ response weighting factor as a binary value including either a low weighting factor or a high weighting factor.

Another example set of embodiments is an apparatus for controlling engine operations to a low $NO_x$ output amount at low selective catalytic reduction (SCR) temperature values and alternatively for controlling engine operations in an EGR cooler bypass regime at low engine load levels. An example apparatus includes a controller structured to functionally execute the operations of the apparatus. The controller interprets a present speed and a present load of an engine, determines an engine operating region in response to the present speed and the present load, provides an EGR cooler bypass command that provides EGR cooler bypass flow in response to the engine operating region being a first region, the first region comprising a low engine load region, operates the engine with supplemental $NO_x$ management in response to the engine operating region being a second region, the second region comprising an intermediate engine load region, and operates the engine without either of the EGR cooler bypass or the supplemental $NO_x$ management in response to the engine operating region being a third region.

In certain embodiments, the controller further interprets a current SCR $deNO_x$ efficiency value, and operates the engine with supplemental $NO_x$ management further in response to the SCR $deNO_x$ efficiency value. An example controller further interprets a $NO_x$ reduction parameter including, without limitation, an SCR catalyst bed temperature, an SCR catalyst inlet temperature, and/or an SCR catalyst present space velocity. The controller further interprets the current SCR $deNO_x$ efficiency value in response to the $NO_x$ reduction parameter(s). In certain embodiments, the controller interprets an SCR $NO_x$ in value and/or an SCR reductant in value, and operates the engine with supplemental $NO_x$ management further in response to the SCR $NO_x$ in value and/or the SCR reductant in value.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
   operating an engine to produce an exhaust flow;
   interpreting a present engine speed and a present engine load;
   determining an engine operating region in response to the present engine speed and the present engine load;
   operating the engine with an EGR cooler bypass and bypassing an EGR cooler with exhaust flow recirculated to the engine in response to the engine operating region being a first region;
   operating the engine with supplemental $NO_x$ management and reducing a $NO_x$ output of the engine in response to the engine operating region being a second region; and
   operating the engine without the EGR cooler bypass and without the supplemental $NO_x$ management in response to the engine operating region being a third region.

2. The method of claim 1, wherein the first region comprises a low engine power region, and wherein the second region comprises an intermediate engine power region.

3. The method of claim 1, further comprising determining a $NO_x$ response weighting factor, and wherein operating the engine with supplemental $NO_x$ management comprises operating between zero supplemental $NO_x$ response and a full supplemental $NO_x$ response according to the $NO_x$ response weighting factor.

4. The method of claim 3, wherein the supplemental $NO_x$ response comprises a grouped set of engine behaviors, the set of engine behaviors comprising a plurality of engine behaviors selected from the behaviors consisting of: a torque to fuel conversion model, one or more fuel injection timing values, one or more fuel injection quantity values, a charge flow amount target, and an EGR flow amount target.

5. The method of claim 3, further comprising determining the $NO_x$ response weighting factor in response to one of an SCR catalyst bed temperature and an SCR catalyst inlet temperature, and wherein the $NO_x$ response weighting factor is a binary value comprising one of a low weighting factor and a high weighting factor.

6. The method of claim 5, further comprising applying a hysteresis to the binary value.

7. The method of claim 3, further comprising determining the $NO_x$ response weighting factor in response to one of:
   an SCR catalyst bed temperature;
   a current SCR $deNO_x$ efficiency;
   a two dimensional lookup based on SCR catalyst bed temperature and current SCR $deNO_x$ efficiency; and
   an SCR catalyst inlet temperature.

8. The method of claim 7, wherein the $NO_x$ response weighting factor comprises a value between zero (0) and one (1) inclusive, wherein a zero indicates that zero supplemental $NO_x$ response is applied and a one indicates that a full supplemental $NO_x$ response is applied.

9. The method of claim 8, wherein the supplemental $NO_x$ response comprises a grouped set of engine behaviors, the set of engine behaviors comprising a plurality of engine behaviors selected from the behaviors consisting of: a torque to fuel conversion model, one or more fuel injection timing values, one or more fuel injection quantity values, a charge flow amount target, and an EGR flow amount target.

10. A system, comprising:
    an internal combustion engine receiving intake gas and producing exhaust gas;
    an exhaust operationally coupled to the engine and receiving the exhaust gas;
    an exhaust gas recirculation (EGR) system structured to return a portion of the exhaust gas to the intake gas, the EGR system including an EGR cooler and an EGR cooler bypass comprising a controllable EGR cooler bypass valve;
    a controller structured to:
    interpret a present speed and a present load of the engine
    determine an engine operating region in response to the present speed and the present load;
    provide an EGR cooler bypass command that provides EGR cooler bypass flow in response to the engine operating region being a first region;
    operate the engine with supplemental $NO_x$ management to reduce a $NO_x$ output from the engine in response to the engine operating region being a second region; and
    operate the engine without the EGR cooler bypass and without the supplemental $NO_x$ management in response to the engine operating region being a third region; and
    wherein the EGR cooler bypass valve is responsive to the EGR cooler bypass command.

11. The system of claim 10, wherein the first region comprises a low power region and wherein the second region comprises an intermediate power region.

12. The system of claim 10, further comprising a selective catalytic reduction (SCR) aftertreatment system structured to receive at least a portion of the exhaust, the controller further structured to determine a $NO_x$ response weighting factor, and to operate the engine with supplemental $NO_x$ management in response to the $NO_x$ response weighting factor.

13. The system of claim 12, wherein the controller is further structured to operate the engine between a zero supplemental $NO_x$ response and a full supplemental $NO_x$ response according to the $NO_x$ response weighting factor.

14. The system of claim 13, further comprising a common rail fuel system, wherein the supplemental $NO_x$ response comprises a fueling parameter and a torque to fuel conversion model.

15. The system of claim 14, wherein the fueling parameter comprises at least one parameter selected from the parameters consisting of: one or more fuel injection timing values, and one or more fuel injection quantity values.

16. The system of claim 13, wherein the supplemental $NO_x$ response comprises at least one of a charge flow amount target and an EGR flow amount target.

17. The system of claim 13, wherein the controller is further structured to interpret one of an SCR catalyst bed temperature and an SCR catalyst inlet temperature, and to determine the $NO_x$ response weighting factor in response to the one of the SCR catalyst bed temperature and the SCR catalyst inlet temperature.

18. The system of claim 17, wherein the controller is further structured to determine the $NO_x$ response weighting factor as a binary value comprising one of a low weighting factor and a high weighting factor.

19. An apparatus for controlling engine operations to a low $NO_x$ output amount at low selective catalytic reduction (SCR) temperature values and alternatively for controlling engine operations in an EGR cooler bypass regime at low engine load levels, the apparatus comprising:
    a controller structured to:
    interpret a present speed and a present load of an engine;
    determine an engine operating region in response to the present speed and the present load;
    provide an EGR cooler bypass command that provides EGR cooler bypass flow in response to the engine operating region being a first region, the first region comprising a low engine load region;
    operate the engine with supplemental $NO_x$ management to reduce a $NO_x$ output from the engine in response to the engine operating region being a second region, the second region comprising an intermediate engine load region; and operate the engine without the EGR cooler bypass and without the supplemental $NO_x$ management in response to the engine operating region being a third region.

20. The apparatus of claim 19, wherein the controller is further structured to interpret a current SCR $deNO_x$ efficiency value, and to operate the engine with supplemental $NO_x$ management further in response to the SCR $deNO_x$ efficiency value.

21. The apparatus of claim 20, wherein the controller is further structured to interpret at least one $NO_x$ reduction parameter selected from the parameters consisting of: an SCR catalyst bed temperature, an SCR catalyst inlet temperature, and an SCR catalyst present space velocity, and to interpret the current SCR $deNO_x$ efficiency value further in response to the at least one $NO_x$ reduction parameter.

22. The apparatus of claim 20, wherein the controller is further structured to interpret at least one of an SCR $NO_x$ in value and an SCR reductant in value, and to operate the engine with supplemental $NO_x$ management further in response to the at least one of the SCR $NO_x$ in value and the SCR reductant in value.

* * * * *